US007849376B2

(12) United States Patent
Mate et al.

(10) Patent No.: US 7,849,376 B2
(45) Date of Patent: Dec. 7, 2010

(54) DATA ACKNOWLEDGEMENT

(75) Inventors: Amit Mate, Chelmsford, MA (US); Mikko Rinne, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 12/569,183

(22) Filed: Sep. 29, 2009

(65) Prior Publication Data

US 2010/0023832 A1 Jan. 28, 2010

Related U.S. Application Data

(63) Continuation of application No. 10/030,207, filed as application No. PCT/IB00/00962 on Jul. 3, 2000, now Pat. No. 7,603,606.

(30) Foreign Application Priority Data

Jul. 2, 1999 (GB) ................................ 9915593.9

(51) Int. Cl.
*G08C 25/02* (2006.01)
*H04L 1/18* (2006.01)

(52) U.S. Cl. ...................................................... 714/748

(58) Field of Classification Search .................. 714/748
See application file for complete search history.

(56) References Cited

U.S. PATENT DOCUMENTS 4,617,657 A * 10/1986 Drynan et al. .............. 370/394
4,841,526 A 6/1989 Wilson et al.
4,905,234 A * 2/1990 Childress et al. ............ 370/349
4,975,952 A 12/1990 Mabey et al.
5,084,877 A * 1/1992 Netravali et al. ............ 714/748
5,245,616 A * 9/1993 Olson ......................... 714/748
5,315,617 A 5/1994 Guida et al.
5,440,545 A * 8/1995 Buchholz et al. ............ 370/426
5,444,718 A * 8/1995 Ejzak et al. ................. 714/748
5,448,623 A * 9/1995 Wiedeman et al. .......... 455/430
5,553,083 A * 9/1996 Miller ........................ 714/748
5,603,081 A * 2/1997 Raith et al. .............. 455/435.3
5,633,874 A * 5/1997 Diachina et al. ............ 370/329
5,727,002 A * 3/1998 Miller et al. ................ 714/748
5,784,362 A * 7/1998 Turina ........................ 370/321
6,367,045 B1 * 4/2002 Khan et al. ................. 714/748
6,643,813 B1 * 11/2003 Johansson et al. ........... 714/748
6,778,501 B1 * 8/2004 Malmgren et al. .......... 370/236

* cited by examiner

*Primary Examiner*—Joseph D Torres
(74) *Attorney, Agent, or Firm*—Banner & Witcoff, Ltd.

(57) ABSTRACT

A method for generating acknowledgement messages in a data transmission system having a receiver for receiving datagrams and being capable of determining which of a series of datagrams have been incorrectly received, the method comprising generating a plurality of a data units, each data unit comprising: a status bit indicative of the status of the data unit; and a plurality of spacing bits together forming a binary representation of a number at least partially indicative of the spacing between one incorrectly received datagram and a succeeding incorrectly received datagram. Apparatus for carrying out various aspects of the methods are also provided.

23 Claims, 1 Drawing Sheet

DATA ACKNOWLEDGEMENT

CROSS-REFERENCE TO RELATED APPLICATIONS

This application is a continuation of U.S. Ser. No. 10/030,207, filed on Aug. 10, 2004, which is a U.S. national stage of PCT/IB00/00962, filed on Jul. 3, 2000, which claims priority to U.K. application number 9915593.9, filed on Jul. 2, 1999. The aforementioned priorities are hereby claimed.

BACKGROUND

This invention relates to data acknowledgement, in particular to providing an indication of erroneously received data.

In many data transmission systems data is sent in the form of a plurality of datagrams (e.g. packets). The datagrams are typically in the form of binary information. A datagram may represent self-contained information or may represent part of a larger message that can be recovered at a receiver by combining a number of received datagrams together. The packets of a message may follow different routes over a data transmission network between the transmitter and the receiver but can still be re-combined when they have arrived correctly. In addition to message (payload) data, datagrams frequently contain control information (e.g. in the form of a header). The control information typically includes:

1. information that identifies the receiver to which the datagram is to be directed;
2. information that identifies the datagram, for example by means of a serial number; and
3. error check information, such as a checksum, which allows the receiver to check the integrity of the datagram once it has been received, to determine whether the datagram has been corrupted during transmission.

Since datagrams can be corrupted during transmission, especially over noisy data links such as those carried by radio connections, it is normal to implement an acknowledgement (ARQ) scheme so that the receiver can indicate to the transmitter which packets have been received erroneously. When datagrams have been received the receiver uses error check data in the datagrams' headers, or other means, to check whether each datagram has been received intact. Then, periodically or on request from the transmitter, the receiver transmits acknowledgement messages to the transmitter to indicate which datagrams have been received incorrectly.

Two basic types of acknowledgement message are common. In the bitmap acknowledgement system an acknowledgement message includes a set of bits each of which corresponds to a single datagram. One status of a bit (e.g. 1) indicates that the corresponding datagram has been correctly received. The other status of a bit (e.g. 0) indicates that the corresponding datagram has been incorrectly received. Thus, in this scheme one bit of acknowledgement message data is needed for each received datagram, whether correctly received or not. In the list acknowledgement scheme an acknowledgement message lists the identifier (e.g. serial number) of each incorrectly received datagram. In this scheme the number of bits needed for acknowledgement message data is the product of the number of incorrectly received datagrams and the number of bit-length of the datagram identifiers.

The efficiency of these schemes depends on the proportion of datagrams that are received incorrectly. If many datagrams are received incorrectly then the bitmap system is more efficient, since the list system would require relatively high bandwidth to retransmit a large number of datagram identifiers. If few datagrams are received incorrectly then the list system is more efficient, since the bitmap system would use a bit of acknowledgement data even for each of the correctly received datagrams.

To reduce the amount of bandwidth needed for acknowledgement another proposal has been for a hybrid system in which the receiving unit selects the bitmap system or the list system, whichever would be more efficient, and then indicates in the acknowledgement message which method is being used.

In next generation telecommunications systems high data rates are to be used, but the optimum size of a datagram giving both good payload versus header size ratio and good resolution for error correction may be fairly small. This is likely to result in a large number of datagrams having to be acknowledged with a single acknowledgement message. For this and other reasons it would be desirable to further reduce the bandwidth needed for acknowledgement messages.

BRIEF SUMMARY OF THE INVENTION

According to one aspect of the present invention there is provided a method for generating acknowledgement messages in a data transmission system having a receiver for receiving datagrams and being capable of determining which of a series of datagrams have been incorrectly received, the method comprising generating a plurality of a data units, each data unit comprising: a status bit indicative of the status of the data unit; and a plurality of spacing bits together forming a binary representation of a number at least partially indicative of the spacing between one incorrectly received datagram and a succeeding incorrectly received datagram.

An acknowledgement message suitably comprises a plurality of the said data units, and may be generated by assembling a plurality of the said data units together, optionally, with flow control information such a routing or error check information.

According to a second aspect of the present invention there is provided a receiver for receiving a series of datagrams from a transmitter, comprising: a datagram checking unit for determining which of the datagrams have been incorrectly received; and an acknowledgement message generator for generating acknowledgement messages, each acknowledgement message comprising a plurality of a data units, each data unit comprising: a status bit indicative of the status of the data unit; and a plurality of spacing bits together forming a binary representation of a number at least partially indicative of the spacing between one incorrectly received datagram and a succeeding incorrectly received datagram.

Preferably one value of a status bit is indicative of its corresponding data unit not being the last data unit of a set of consecutive data units whose spacing bits together represent a number indicative of a spacing between one incorrectly received datagram and a succeeding incorrectly received datagram. Thus, a spacing may be indicated by:

1. the spacing bits of a single data unit that has its status bit set to the other value than said one value; or
2. the spacing bits of a plurality of (suitably consecutive) data units that have their status bits set to the said one value together with the spacing bits of a subsequent (suitably immediately subsequent) data unit that has its status bit set to the said other value.

Preferably a datagram that has its status bit set to the said other value and its spacing bits representing a predetermined number (suitably but not necessarily zero) is indicative of adjacent (suitably subsequent) data units representing a number indicative of several consecutive incorrectly received datagrams. Thus, a plurality of consecutive incorrectly received datagrams may be indicated by a datagram having its status bit set to the said other value and its spacing bits representing the predetermined number, followed by one or more data units representing the number of the consecutive incorrectly received datagrams. That number may be indicated by one or more datagrams in the manner specified above for indicating spacings.

The indicated spacings and/or numbers of consecutive incorrectly received datagrams may indicate in either case the actual spacings and/or numbers directly or indirectly by means of a number that is a function of the actual spacings and/or numbers, for example that is a predetermined number less than the actual spacings and/or numbers.

An acknowledgement message suitably includes data identifying the set of datagrams whose reception is described by the message, for example the identity of the first and/or last datagram described by the message and/or the number of datagrams whose reception is described by the message. The acknowledgement message may take the form of one or more datagrams or data packets.

Suitably each data unit consists of four or more bits, preferably an integer multiple of four or eight bits. Most preferably each data unit consists of four bits.

The method preferably comprises the step of generating an acknowledgement message comprising the plurality of data units and transmitting that message to a transmitter of the datagrams.

The receiver preferably comprises a memory connected to the datagram checking unit for storing information indicating which of the datagrams has been incorrectly received. The memory may also be connected to the acknowledgement generator.

Each datagram may comprise checksum or other error check information. The receiver, most preferably the said datagram checking unit, is suitably capable of calculating a checksum for a received datagram and comparing that checksum with the checksum information comprised in the datagram to determine whether the datagram is correctly received.

The acknowledgement generator may preferably be implemented in hardware.

The communication link from the transmitter to the receiver preferably comprises a radio link, which may run all or part of the way between the two. The receiver is suitably a radio receiver. The receiver is suitably a cellular radio terminal. The radio link is suitably a cellular telephone radio link. The radio link is suitably a wideband code division multiple access link.

BRIEF DESCRIPTION OF THE DRAWINGS

The present invention will now be described by way of example with reference to the accompanying drawing, in which.

DETAILED DESCRIPTION

Figure 1:
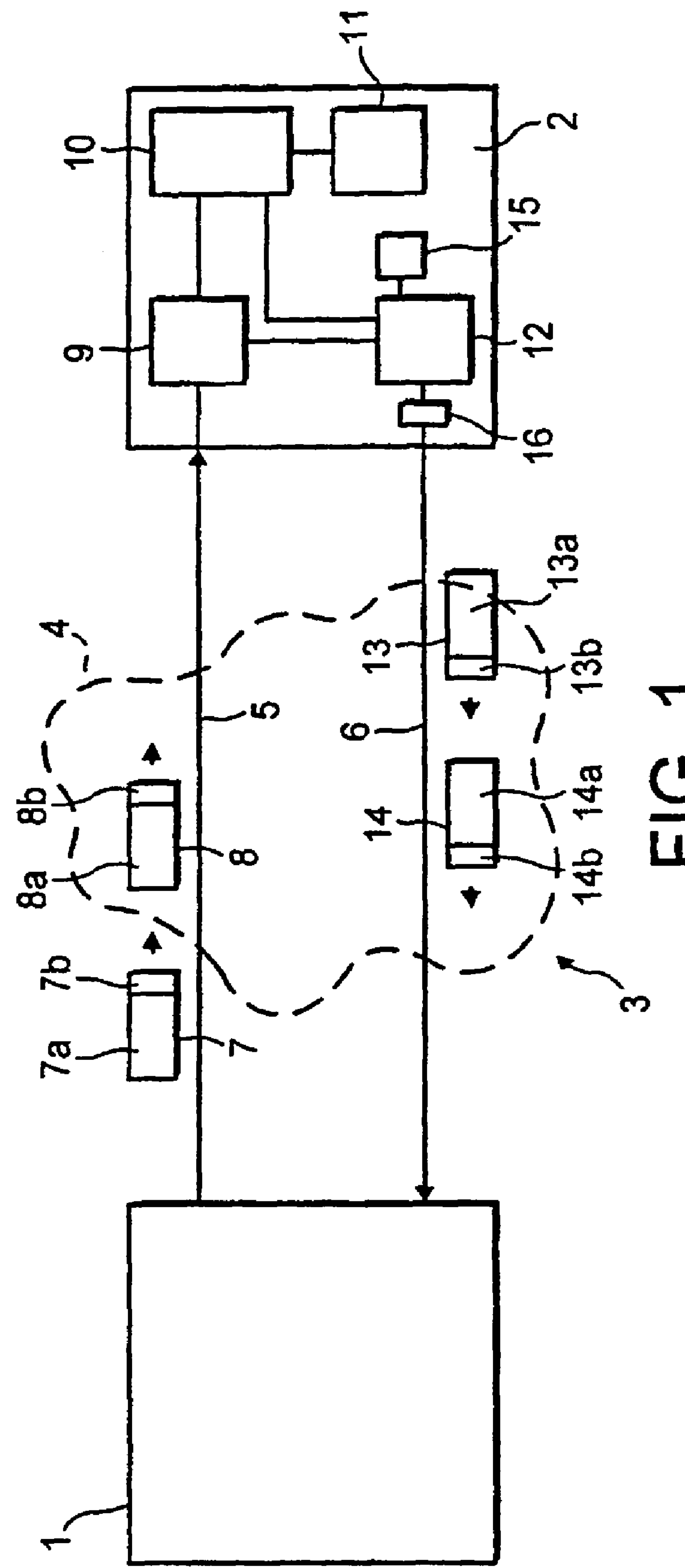
FIG. 1 illustrates a data transmission system.

FIG. 1 shows a data transmission system having a transmitter 1 and a receiver 2 connected by a bi-directional communication link 3 of a telecommunications system 4. The communication link 3 has a forward channel 5 and a reverse channel 6. The transmitter is capable of transmitting datagrams (illustrated at 7, 8) to the receiver over the forward channel. Each datagram includes a payload 7*a*, 8*a* and a header 7*b*, 8*b* that the packet's serial number and a checksum for the packet. If the communications link is realised as a dedicated channel (e.g. a circuit switched connection) then the link itself can indicate the receiver's identity. If the communications link (or part of it) is realised as a common or shared channel then the receiver's identity is preferably indicated in the packed, suitably in the packet's header.

In the telecommunications system 4 the dedication of a channel between the transmitter and receiver and/or the information in the header that gives the receiver's identity is used to route the packet to the receiver.

At the receiver a received datagram is analysed by check unit 9. The check unit calculates a checksum for the datagram as received and compares the calculated checksum with the checksum as received in the datagram's header. If the two checksums match then the check unit accepts the datagram and passes it to datagram processor 10. If the datagram processor determines that the datagram is a control datagram it enables the required action to be taken dependant on the datagram's content. If the datagram's payload represents message data then if necessary the datagram processor reassembles the payload together with those of other datagrams to reconstruct the full message and then stores it in memory 11.

If the check unit determines that the calculated checksum does not match the received checksum then it signals acknowledgement unit 12 that the datagram has been incorrectly received—for example by passing the acknowledgement unit the serial number of the incorrectly received datagram. The acknowledgement unit is capable of transmitting acknowledgement messages 13, 14 to the transmitter over reverse channel 6 to indicate to the transmitter which datagrams have been received incorrectly. If the transmitter receives an indication that a datagram has been received incorrectly then it can re-transmit the datagram to the receiver.

The datagram processor can also signal to the acknowledgement unit that a datagram has been incorrectly received if after a certain time an expected datagram has not been received at the receiver at all. To do this the datagram processor may determine the serial number of the expected datagram and send that to the acknowledgement unit. Such non-reception of a datagram may occur if, for example, the datagram processor receives only 6 datagrams of a 10-datagram message.

Reasons for incorrect reception of datagrams include corruption during transmission, for example because of noisy links or other interference, or loss or excessive transmission delay due to faults or overload in the telecommunications system.

The acknowledgement unit has two modes of operation. In the unsolicited mode it transmits acknowledgement messages to the transmitter 1 periodically—for example after every 100 datagrams of a message from the transmitter have been received (or should have been received). In the solicited mode it transmits acknowledgement messages to the transmitter 1 on request, or when it determines that such a request is overdue (e.g. at the end of a received message).

The acknowledgement messages 13, 14 sent from the acknowledgement unit to the transmitter 1 are sent in the form of datagrams that include a payload 13*a*, 14*a* and a header 13*b*, 14*b*. The format of the headers of the acknowledgement datagrams 13, 14 can be the same as the format of the headers 7*b*, 8*b*, or may be different, but the two are preferably compatible.

The payload of each acknowledgement datagram comprises a series of 4-bit elements. Each 4-bit element is capable of indicating information on at least one incorrectly received datagram. Each 4-bit element includes two notional parts. In most situations the first three bits of the element are interpreted as an "offset part" which represents in binary form a number from zero to seven and the final bit of the datagram is interpreted as a "status part" which represents a logical state as 1 or 0.

As signals are received from the check unit or the datagram processor the acknowledgement unit stores in a local memory 15 the serial numbers of the incorrectly received datagrams. When the acknowledgement unit determines that an acknowledgement message is to be sent it analyses the stored list in order to generate the 4-bit elements to be sent to the transmitter via transmitting unit 16.

To carry the acknowledgement messages the 4-bit elements are used to represent a series of numbers. A number is represented by the following process:

1. The number as represented in binary is split into chunks of three consecutive bits starting from the three least significant bits. The final, most significant, chunk is padded if necessary with leading zeros so that it occupies three bits.
2. If the represented number is greater than 7 then there will be more than one chunk. Each of the chunks except for the most significant are formed into successive 4-bit elements in which the respective chunk forms the offset part and the status bit is set to 0.
3. The most significant chunk is formed into a final 4-bit element in which that chunk forms the offset part and the status bit is set to one.

For example, the following table shows some numbers and their equivalents in 4-bit elements formed by the above method:

| Number | Equivalent in 4-bit elements |
|---|---|
| 4 | 1001 |
| 7 | 1111 |
| 12 | 0010 1001 |
| 149 | 0100 0100 1011 |

To represent incorrect reception of a series of datagrams by means of the 4-bit elements the acknowledgement unit performs the following steps:

1. It determines the number of the first incorrectly received datagram of the series. That number is encoded into the payload of the acknowledgement message.
2. For each subsequent incorrectly received datagram it determines the offset in number of datagrams between that datagram and the previous incorrectly received datagram of the series. That number is encoded in 4-bit elements as described above.

The series of 4-bit elements that has been generated in this way is formed into a bit stream and transmitted to the transmitter in one or more datagrams. At the receiver the 4-bit elements are decoded by a reverse process to determine which datagrams were not received correctly. Those datagrams are then re-transmitted to the receiver.

The number of the first incorrectly received datagram could be indicated as the number of that datagram (e.g. as 5 if the fifth datagram were the first incorrectly received datagram).

In the scheme described above the 4-bit element 0001 cannot be generated since the acknowledgement unit can have no cause to represent an offset of zero between one incorrectly received datagram and the next. The element 0001 can therefore be used to help represent a burst of datagrams. A burst of datagrams can be represented by elements indicating in the normal way the first incorrectly received datagram of the burst (by means of the offset to it), followed by the element 0001, followed by elements representing the number of subsequent consecutive incorrectly received datagrams in the manner described above.

When the length of each element is four bits preferably the latter method is only used to represent a burst of four or more incorrectly received datagrams since otherwise it does not provide increased efficiency. If it is known that this method will only be used for bursts of four or more datagrams then the number represented by the element(s) following the element 0001 can be one, two, three or four less than the length of the burst, to reduce the number of elements needed in some cases.

An alternative way to represent bursts is by a series of elements indicating in the normal way the first incorrectly received datagram of the burst, followed by the element 0001, followed by an element representing the number of subsequent consecutive incorrectly received datagrams in conventional binary notation using all four bits of that element. The maximum length of burst that can be represented by three elements in this way is 20 (assuming that the method is not used for bursts of fewer than four consecutive incorrectly received datagrams and that number represented by the latter datagram is four less than the total burst length). However, this limitation is unlikely to cause significant decreases in efficiency in systems in which long bursts of incorrectly received datagrams are relatively rare (e.g. in the proposed W-CDMA/UMTS system under fast power control).

For completeness, an acknowledgement message preferably also indicates the range of datagrams that it covers. This can allow the transmitter to recover from loss or corruption of an acknowledgement message. An acknowledgement message could indicate the number of received datagrams that it covers and/or the identity/serial numbers of the first and/or last datagrams covered. In a most preferred arrangement each acknowledgement datagram comprises the serial number of the first packet in error in the range of packets covered by the acknowledgement datagram followed by a series of 4-bit elements describing the subsequent erroneous packets in that range.

As an example of the method described above, if in 100 datagrams numbers 5 to 14, 31, 33 and 36 were received incorrectly the following table shows the numbers and the corresponding 4-bit elements that could be generated by the acknowledgement unit and transmitted to the transmitter.

| Number | 4-bit elements | Explanation |
|---|---|---|
| 5 | 0000 0000 1011 | Offset to first erroneous datagram, assuming 12-bit sequence numbering |
| | 0001 | Indicates start of burst |
| 9 | 0010 0011 | Length of burst (excluding first datagram of burst) |
| 17 | 0100 0011 | Offset to next erroneous datagram |
| 2 | 0101 | Offset to next erroneous datagram |
| 3 | 0111 | Offset to next erroneous datagram |

In general acknowledgement encoding according to the above method may comprise:

a data section indicating the location in an overall message of the start or end of the window of datagrams covered by the acknowledgement message;

a data section indicating the location of the first incorrectly received datagram in the window;

a series of data sections indicating the offsets to subsequent incorrectly received datagrams and/or bursts of incorrectly received datagrams.

These may be in any suitable order. Other data may also be included in the message.

An additional reduction in bandwidth can be had in some circumstances by the acknowledgement unit initially determining the smallest spacing in the set of datagrams under consideration between incorrectly received datagrams. That spacing can be transmitted to the transmitter in the acknowledgement message and can be subtracted from all the transmitted offsets to reduce (in some cases) the number of bits needed to express them.

Instead of 4-bit elements, the elements could have other numbers of bits—either less or more preferably more than 4. In an n-bit element the status part could still comprise one bit and the offset part (n−1) bits. The optimum number of bits to give the greatest efficiency for a specific application could be determined by simulation. For efficient packing and alignment of the elements it is also preferred that the length of the element is an integer multiple of the system's byte length or divides the system's byte length integrally. For example, in systems that are based around 8-bit bytes the bit-length of the elements is preferably 4 or 8 bytes or an integer multiple of 8 bytes. This facilitates byte alignment of the elements for efficient encoding and transmission.

The acknowledgement method described above offers particular efficiency advantages in digital radio communication systems, e.g. digital cellular telephone systems, and especially the proposed third-generation W-CDMA (wideband code division multiple access) or 3GPP system, for the following reasons.

1. In some systems bandwidth usage over the reverse link may be relatively unimportant, for instance if the reverse link is allocated a fixed, relatively large bandwidth. However, in the W-CDMA system use of bandwidth on the reverse link will cause interference with other transmissions on the same frequency band, reducing the signal to noise ratio of those other transmissions. Therefore, an efficient acknowledgement scheme is particularly advantageous.
2. Use of elements having four bits fits conveniently with the bit/frame scheme of the proposed W-CDMA system, allowing byte alignment. This allows 4-bit elements to be sent conveniently.
3. In order to achieve very high data rates it is preferred that the acknowledgement unit that generates acknowledgement messages is implemented at a very low level in a terminal, possibly in hardware rather than software. The acknowledgement method described above is logically uncomplicated and especially suitable for low-level implementation. The choice of a length of the elements that fits conveniently with the framework of an existing protocol also assists low-level implementation.
4. In radio systems incorrectly received datagrams occur relatively frequently in bursts, due for example to temporary interferers or lags of power control. The method described above provides a way of describing bursts of incorrectly received datagrams.
5.

In a 3GPP/W-CDMA system the present method may advantageously be used for USTAT (unsolicited status) and/or STAT (solicited status) reports from a receiving unit in acknowledged data transfer mode, suitably in the form of status PDUs (protocol data units). Acknowledgement datagrams as described above may be used for AMD (acknowledged mode data) PDUs and/or UMD (unacknowledged mode data) PDUs. Such PDUs may convey sequentially numbered protocol units containing RLC (radio link control) SDU (service data unit) data. (See the 3GPP RLC draft specification TS 25.322 V1.0.0).

In simulations the acknowledgement method described above has been found to be more efficient than the bitmap, list or hybrid systems. The following table shows the number of bits required to transmit an acknowledgement message for the indicated incorrectly received datagrams from a set of 100 datagrams, together with proposed basic data structure for acknowledgement messages in the W-CDMA system.

| | Bit requirements | | | |
|---|---|---|---|---|
| Incorrectly received datagrams | List scheme | Bitmap scheme | Hybrid scheme | Present method |
| None | 24 | 100 | 14 | 12 |
| 51 to 64 | 168 | 100 | 36 | 32 |
| 3, 7, 11, 16, 33, 44, 55, 66, 78, 82, 91 | 156 | 100 | 120 | 88 |
| 5 to 14, 31, 33, 36 | 180 | 100 | 62 | 48 |

In another simulation datagram transmission over a W-CDMA data channel was simulated by estimating loss of random frames to a selected frame error rate and assuming all datagrams within the lost frames to be incorrectly received. The simulation was run for NRT data traffic with USTAT functionality, USTAT reports being generated every third frame and a session being 100 units. 18,000 datagrams were generated. FSN (first sequence number) and MSN (maximum sequence number) fields were considered mandatory. The results are shown in the following table.

| Acknowledgement Scheme | Maximum size of acknowledgement datagram | Average bit requirement per acknowledgement diagram |
|---|---|---|
| Bitmap | 144 | 42.97 |
| List | 288 | 92.3 |
| Hybrid | 140 | 46.23 |
| Present method | 60 | 20.03 |

The datagrams may be of fixed or variable lengths. All or part of the communication link between the transmitter and the receiver may be a radio link. The transmitter and/or the receiver may be a radio terminal.

The datagrams may be packets or protocol data units.

The data transmission system or part of it suitably is or is part of a mobile communication network, for example a mobile telephone network such a the proposed UMTS system or a derivative thereof.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. An apparatus comprising:

a transmitter configured to receive an acknowledgment message comprising a plurality of data units, each data unit comprising a status bit indicative of a status of the data unit and a plurality of spacing bits, wherein the plurality of spacing bits from the plurality of data units together form a binary number, the binary number being the spacing between one incorrectly received datagram and a succeeding incorrectly received datagram and to determine from the acknowledgement message which of a plurality of datagrams have been incorrectly received.

2. An apparatus as claimed in claim 1 wherein the transmitter is configured to retransmit datagrams which have been incorrectly received.

3. An apparatus as claimed in claim 1 wherein the transmitter is configured to transmit datagrams comprising checksum information.

4. An apparatus as claimed in claim 1, wherein each data unit consists of four bits.

5. An apparatus as claimed in claim 1, wherein said acknowledgement message comprises at least one further data unit indicating a location of a first incorrectly received datagram.

6. An apparatus as claimed in claim 1, wherein one value of the status bit is indicative of its corresponding data unit not being the last data unit of said plurality of data units whose spacing bits together are said binary number.

7. An apparatus as claimed in claim 6, wherein said one value of the status bit indicative of its corresponding data units not being the last data unit is 0.

8. An apparatus as claimed in claim 1, wherein said acknowledgement message comprises a first data unit having predetermined binary bits to indicate a burst of incorrectly received datagrams and one or more burst data units indicating the length of the burst of incorrectly received datagrams.

9. An apparatus as claimed in claim 8, wherein said predetermined binary bits are 0001.

10. An apparatus as claimed in claim 1, wherein one value of the status bit is indicative of its corresponding data unit being the last data unit of said plurality of data units whose spacing bits are said binary number.

11. An apparatus as claimed in claim 10, wherein the one value of the status bit is 1.

12. An apparatus for determining which of a series of datagrams have been incorrectly received, the apparatus comprising:

means for receiving an acknowledgement message comprising a plurality of data units, each data unit comprising a status bit indicative of a status of the data unit and a plurality of spacing bits, wherein the plurality of spacing bits from the plurality of data units together form a binary number, the binary number being the space in between one incorrectly received datagram and a succeeding incorrectly receiving datagram; and means for determining from the acknowledgement message which of a plurality of datagrams have been incorrectly received.

13. A method comprising:

receiving an acknowledgment message comprising a plurality of data units, each data unit comprising a status bit indicative of a status of the data unit and a plurality of spacing bits, wherein the plurality of spacing bits from the plurality of data units together form a binary number, the binary number being the spacing between one incorrectly received datagram and a succeeding incorrectly received datagram; and determining from the acknowledgement message which of a plurality of datagrams have been incorrectly received.

14. A method as claimed in claim 13, comprising retransmitting datagrams which have been incorrectly received.

15. A method as claimed in claim 13, comprising transmitting datagrams, said datagrams comprising checksum information.

16. A method as claimed in claim 13, wherein each data unit consists of four bits.

17. A method as claimed in claim 13, wherein said acknowledgement message comprises at least one further data unit indicating a location of a first incorrectly received datagram.

18. A method as claimed in claim 13, wherein one value of the status bit is indicative of its corresponding data unit not being the last data unit of the plurality of data units whose spacing bits together are said binary number.

19. A method as claimed in claim 18, wherein said one value of the status bit indicative of its corresponding data unit not being the last data unit is 0.

20. A method as claimed in claim 13, wherein said acknowledgement message comprises a first data unit having predetermined binary bits to indicate a burst of incorrectly received datagrams and one or more burst data units indicative of the length of the burst of incorrectly received datagrams.

21. A method as claimed in claim 20, wherein said predetermined binary bits are 0001.

22. A method as claimed in claim 13, wherein one value of the status bit is indicative of its corresponding data unit being the last data unit of the plurality of data units whose spacing bits are said binary number.

23. A method as claimed in claim 22, wherein said one value of the status bit is 1.

* * * * *